United States Patent [19]

Bobeck et al.

[11] 3,887,905

[45] June 3, 1975

[54] MAGNETIC DOMAIN SHIFTING ARRANGEMENT EMPLOYING MOVABLE STRIP DOMAIN

[75] Inventors: Andrew Henry Bobeck, Chatham; Henry Evelyn Derrick Scovil, Gladstone, both of N.J.

[73] Assignee: Bell Telephone Laboratories, Incorporated, Murray Hill, N.J.

[22] Filed: Jan. 29, 1973

[21] Appl. No.: 327,625

[52] U.S. Cl. ...................... 340/174 TF; 340/174 SR

[51] Int. Cl. ...................... G11c 11/14; G11c 19/00

[58] Field of Search ................ 340/174 TF, 174 SR

[56] References Cited

UNITED STATES PATENTS

| | | | |
|---|---|---|---|
| 3,676,872 | 7/1972 | Lock | 340/174 TF |
| 3,701,127 | 10/1972 | Bobeck et al. | 340/174 TF |
| 3,735,145 | 5/1973 | Heinz | 340/174 TF |

OTHER PUBLICATIONS

IEEE Transactions on Magnetics, "Interactions of Magnetic Domain Walls with Twin and Grain Boundaries in Orthoferrites," by Kurtzig; Vol. Mag. 6; No. 3; 9/70; p. 497–500.

*Primary Examiner*—Stanley M. Urynowicz, Jr.
*Attorney, Agent, or Firm*—H. M. Shapiro

[57] ABSTRACT

Magnetic crystals have been found capable of structuring themselves into information channels under certain magnetic conditions. A propagation mechanism for moving magnetic domains, such as bubbles, along channels so defined has been discovered also. The dimensions of the channel and the size of the bubbles movable along the channel depend on material properties rather than on photolithographic resolution. Thus, the necessity for photolithographic processing previously employed for defining the familiar bubble movement implementations is eliminated, and both packing densities and yields are expected to be extremely high.

16 Claims, 8 Drawing Figures

MAGNETIC DOMAIN SHIFTING ARRANGEMENT EMPLOYING MOVABLE STRIP DOMAIN

FIELD OF THE INVENTION

This invention relates to magnetic memories and more particularly to such memories in which information can be represented as single wall domains.

BACKGROUND OF THE INVENTION

Single wall domain memories, the most familiar of which are called "bubble memories", are described, for example, in P. I. Bonyhard, U. F. Gianola, A. J. Perneski, U.S. Pat. No. 3,618,054 issued Nov. 2, 1971. The particular memory disclosed in that patent is referred to as a "major-minor" memory in which information is transferred from minor loops to a single major loop. The minor loops operate to recirculate domains in closed loop fashion functioning as a permanent store. The major loop is operative as an accessing channel to which information is transferred for sense, annihilate, and write operations selectively.

A major-minor memory is defined by patterns of magnetically soft elements which respond to a magnetic field rotating in the plane of domain movement in what is commonly known as a "field access" mode of operation. Special operations, such as transfer, detection, generation, etc., are defined by patterns of electrical conductors in cooperation with special ones of those magnetically soft elements. Thus, at least two-level processing, one for the pattern of magnetically soft material and one for the conductors, is necessary. Of course, a reduction in the number of levels of processing results in an increase in yields.

One level processing for bubble memories is permitted by a redesign of the special functions to eliminate the necessity for a separate electrical conductor pattern. Permalloy is electrically conducting as well as magnetically soft. Therefore, a redesign of the special functions, for example, to permit permalloy to serve both the domain movement implementation and the special function implementation has its obvious advantages.

The critical processing in the fabrication of bubble devices depends on the capabilities of photolithographic processing. The dependency is not so acute in the fabrication of special function patterns such as define bubble generators or expansion detectors because time may be taken with, for example, an electron beam to achieve high resolution in one or two small areas of such functions. But in the fabrication of the magnetically soft (field access) propagation elements, for example, either a considerable amount of time is necessary for the scanning process to cover the relatively large area involved or increased power and a reduction in the resolution of the process is required in order to reduce that time. This reduced resolution determines the minimum bubble size operable with the resulting circuit as well as the yield. Since materials are available with bubbles for smaller than the tiniest of presently realizable field access circuits, increased packing density is a processing problem not a material problem. It is clear, then, that a potential exists for improving packing densities and yields by eliminating the dependency of the bubble movement implementation on photolithographic processing.

The ultimate would appear to be a "no-level" process at least as far as the bubble propagation implementation is concerned.

BRIEF DESCRIPTION OF THE INVENTION

The present invention is directed at a magnetic memory which structures itself naturally into channels along which information, such as bubble patterns, can be moved. The invention is based on the recognition that a magnetic crystal of the type suitable, for example, for bubble movement exhibits a strip (or stripe) or a ring domain which occupies a large portion of the material when that material is, for example, in a demagnetized state. It was theorized that the domain could be made to define an information channel if a propagation mechanism could be found operative within a channel so defined.

Certain materials were found to exhibit undulating walls for such strip domains. It has been discovered that the undulations can be made to move, in traveling wave fashion, in a manner to advance information along the walls, in response to a magnetic field rotating in the plane of domain movement.

A variety of embodiments has been devised to employ such a "self-structuring" channel to move information. One embodiment employs one epitaxial layer in which magnetic bubbles are disposed to couple to the traveling wave moving along the walls of a strip domain defined in an adjacent layer. In another, cone-shaped domains are moved along channels defined by undulating walls in the same layer. In still another, perturbation such as Bloch walls are moved along the walls of the strip domains. In each instance, existing domain generators and expansion detectors, or adaptations thereof, are suitable for generating and detecting information.

DETAILED DESCRIPTION

Figure 1:
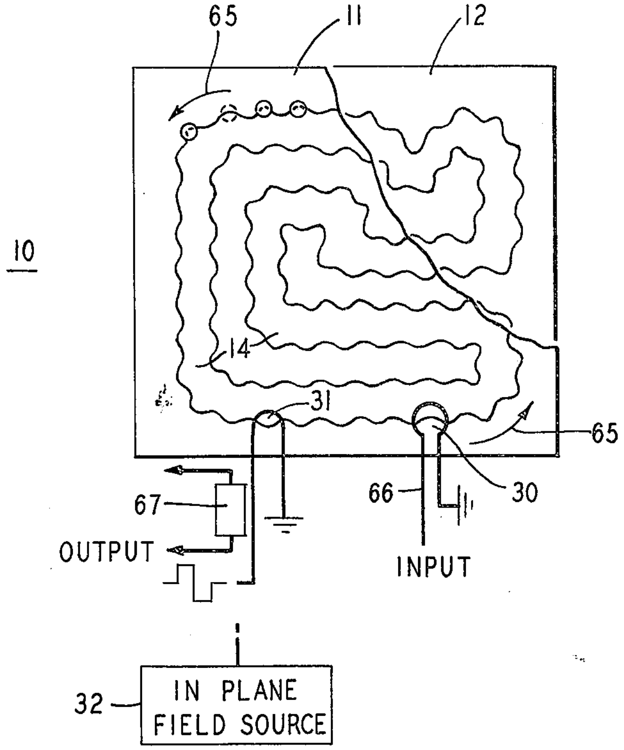
FIG. 1 is a schematic representation of a magnetic arrangement in accordance with this invention.
Figure 2A:
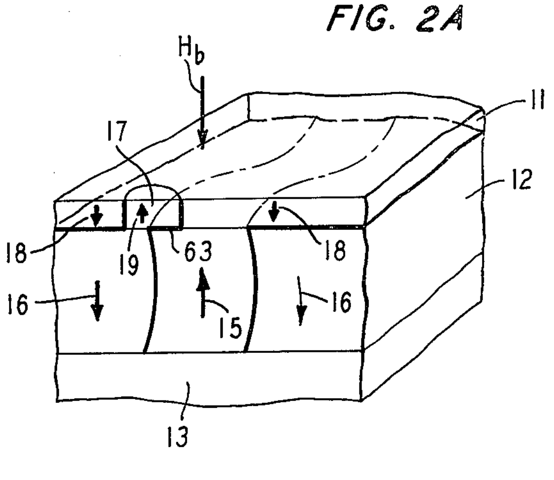
FIGS. 2A, 2B, 3 and 4 are schematic representations of portions of the arrangement of FIG. 1.
Figure 2B:
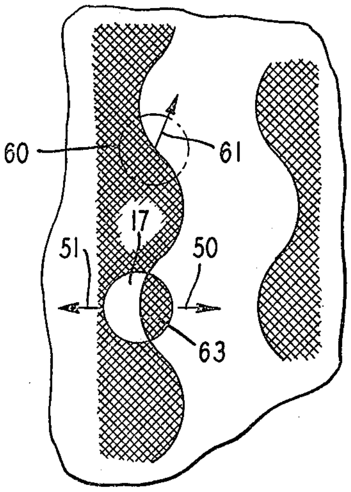

FIG. 1 shows a representative self-structuring arrangement 10 in accordance with an embodiment of this invention. The arrangement includes a layer of material 11 in which single wall domains can be moved. Layer 11 is shown cut away to expose therebeneath a second layer 12 in which strip domains occur under the conditions for which a domain simultaneously occurs in layer 11. FIGS. 2A and 2B show layers 11 and 12 on a substrate 13. The layers 11 and 12 are grown on a suitable substrate by well known liquid phase epitaxial techniques.

First the structure of FIGS. 1, 2A and 2B and its operation are described herein. Thereafter, alternative configurations for the structure along with the material aspects thereof are described.

Layers 11 and 12 are characterized by preferred directions of magnetization normal to the plane of the layers. When in a demagnetized condition, layer 12 exhibits a familiar meandering strip domain 14 (actually shown as a ring domain) which folds back and forth on itself occupying the entire layer. Illustratively, the magnetization in the domain is assumed to be directed upward as indicated by arrow 15 in FIG. 2A. The magnetization in the remainder of layer 12 is directed downward as indicated by arrows 16 in FIG. 2A.

Layer 11 is chosen to exhibit single wall domains under the magnetic conditions prevailing for layer 12 above. That is to say, if layer 12 is chosen to exhibit strip domains in the presence of a bias field represented by arrow $H_b$ in FIG. 2A rather than when the layer is demagnetized, a single wall domain 17 also is present as shown in FIG. 2A in the presence of that bias field. For the illustrative embodiment, layer 11 is chosen to have its reference magnetization downward, as indicated by arrows 18 in FIG. 2A; whereas, the magnetization in domain 17 is directed upwards as indicated by arrow 19.

The domain 14 in FIG. 1 is shown to include an undulating wall. The undulations occur as a result of the choice of material properties and will be discussed in detail hereinafter. Suffice it to say at this juncture in the description that undulating walls of a type found suitable herein are known to exist.

Figure 3:
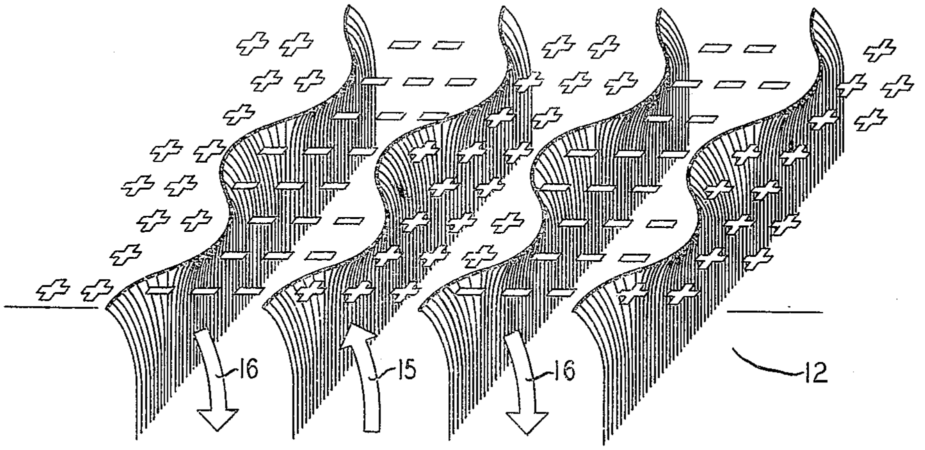

It has been discovered that the undulations move along the channel from some arbitrary first position designated 30 in FIG. 1 to some arbitrary second position 31. The movement of the undulations is discussed in connection with FIGS. 3 and 4. We will adopt the convention that positive poles are associated with the tips of arrows in layer 12 for that discussion. Accordingly, layer 12 may be depicted as including areas of positive and negative poles, as shown, at its top surface where those areas are separated by the buckling wall of meandering (strip) domain 14.

Figure 4:
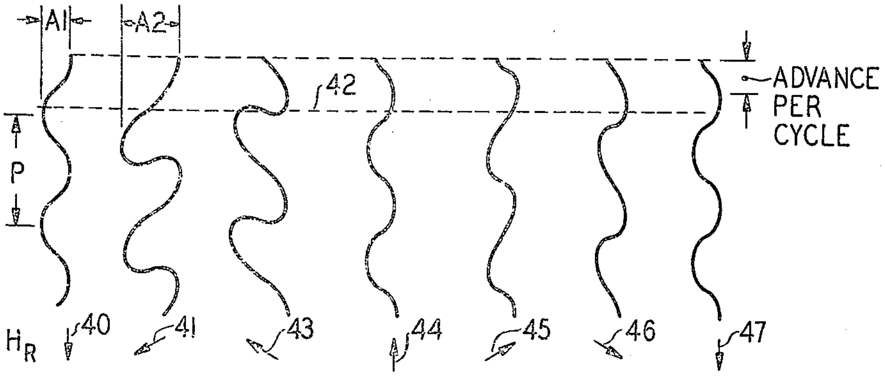

FIG. 4 shows schematic top views of a portion of the wall of the domain 14 of layer 12. As viewed from left to right in FIG. 4, the succession of undulating lines shown in the Figure correspond to a single undulating wall for consecutive directions of an in-plane field, represented by arrow $H_R$ and assumed to be rotating clockwise in the plane of layer 12. The in-plane field is supplied by a familiar source represented by block 32 of FIG. 1. The wall shape is shown for a sequence of seven in-plane field orientations during one cycle of the field.

Movement can be observed by comparing the position of the maximum amplitudes as the field rotates. The period of the undulations is designated P in FIG. 4. The maximum amplitude of the undulation, for an in-plane field directed downward as indicated by arrow 40 in FIG. 4, is represented at A1. When the in-plane field next is directed downward and to the left, as indicated by arrow 41 in FIG. 4, the (previous) maximum amplitude of the undulation increases as shown at A2 in FIG. 4. Also, that maximum is displaced downward as viewed in FIG. 4, as the in-plane field reorients. The downward displacement in each instance is shown by a comparison of the position of the maximum of each curve in FIG. 4, from left to right, with horizontal line 42 corresponding to the assumed position of the initial maximum.

The in-plane field next reorients upward and to the left and, then, directly upwards as indicated by arrows 43 and 44 in FIG. 4 to complete one-half cycle of the in-plane field rotation. The in-plane field completes its cycle by rotating clockwise to the right and then downward through the direction sequence as indicated by arrows 45, 46, and 47 in FIG. 4. The amplitude of the undulation during the second half cycle is smaller than the amplitude during the first half cycle as can be seen from the figure. But during each half cycle, the undulations can be observed to vary in inclination to follow the direction of the in-plane field, the net advance per cycle being indicated in the upper right-hand curve of FIG. 4.

The undulations advance in the opposite direction when the in-plane field sequence is reversed.

Domain 17 of FIG. 2A is coupled to the advancing undulations in a manner to minimize its energy. For example, consider a portion of an undulating wall shown expanded in FIG. 2B with domain 17 superimposed thereon. If the domain is imagined to be offset in the direction indicated by arrow 50, the magnetostatic energy $E_{mag}$ associated with the domain reduces as is clear from the Figure. On the other hand, if the domain is offset in the opposite direction as indicated by arrow 51, the wall energy $E_{wall}$ is reduced. The actual position assumed by the domain with respect to the wall is determined by an equilibrium between the various energy terms.

As the undulations advance, the wall and demagnetizing forces change to apply to the domain a force having a component in the direction of movement of the undulations. The force maintains the domain at the relative positive shown for domain 17 in FIG. 2B. The direction of the force may be appreciated by considering the position of an imaginary domain represented by broken circle 60 of FIG. 2B offset from the relative position which corresponds to that occupied by domain 17. The force applied to the domain is indicated by arrow 61 in FIG. 2B.

When we speak of wall energy in this context, we are directing our attention to the wall which occurs at the interface between layers 11 and 12 of FIG. 1 as indicated at 63 in FIGS. 2A and 2B. The wall occurs between regions having like magnetization in layers 11 and 12 in the illustrative embodiment because the materials of the two layers are chosen with characteristic compensation temperatures on opposite sides of room temperature. Such a material is called a type II material, as disclosed in the *Bell System Technical Journal* dated July-Aug. 1972, Vol. 51, at pages 1431 et seq.

A pattern of domains, as can be appreciated from FIG. 1, maintains its integrity as it moves counterclockwise as indicated by arrow 65 in FIG. 1 because of the registry of bits with consecutive energy minima along the undulating wall. Consequently, it is clear that information represented as a pattern of magnetic bubbles can be moved along a self-structured channel in accordance with this invention.

Information is generated for movement as described at position 30 of FIG. 1. A generator suitable for this purpose is disclosed in copending application, Ser. No. 303,327, filed Nov. 3, 1972 for Y. S. Chen, J. E. Geusic, T. J. Nelson and H. M. Shapiro now U.S. Pat. No. 3,789,375, issued Jan. 29, 1974. The conductor typical of such generators, for selective generation is represented at 66 in FIG. 1.

Domain patterns so generated and propagated are detected at position 31 which is conveniently closely spaced from position 30 to ensure that a bubble or ring domain generated at position 30 for expansion into domain 14 of FIG. 1 couples the detector. The detector is conveniently an expansion magnetoresistance detector of the type disclosed in U.S. Pat. No. 3,702,995, of A. H. Bobeck, F. J. Ciak, and W. Strauss, issued Nov. 14, 1972. The magnetoresistance element is indicated at 67 in FIG. 1.

In one specific example of this embodiment, a layer of samarium yttrium iron garnet is grown by liquid phase epitaxial techniques on a nonmagnetic substrate of gadolinium gallium garnet. The layer has a thickness of 10.7 microns, much larger than the nominal bubble diameter of 3.4 microns. The layer has a magnetization ($4\pi M_s$) of 393 gauss and a $Q = H_k/4\pi M_s$ of about 1.2 where $H_k$ is the anisotropy field normal to the layer. The period of the undulation (see P in FIG. 4) is 10 microns. A second layer of samarium yttrium iron garnet is grown on the first layer. The second layer has a thickness of 3.5 microns and a nominal bubble diameter of 3.0 microns in a bias field of 160 oersteds. An in-plane field of 8 oersteds at a frequency of 500 kilohertz produces a data rate of 100 KHZ.

In general, the materials for the foregoing two-layer embodiment are selected so that $Q = 1$ for the first layer in which domain strip out occurs and so that the second layer is normal for bubble movement.

Figure 5:
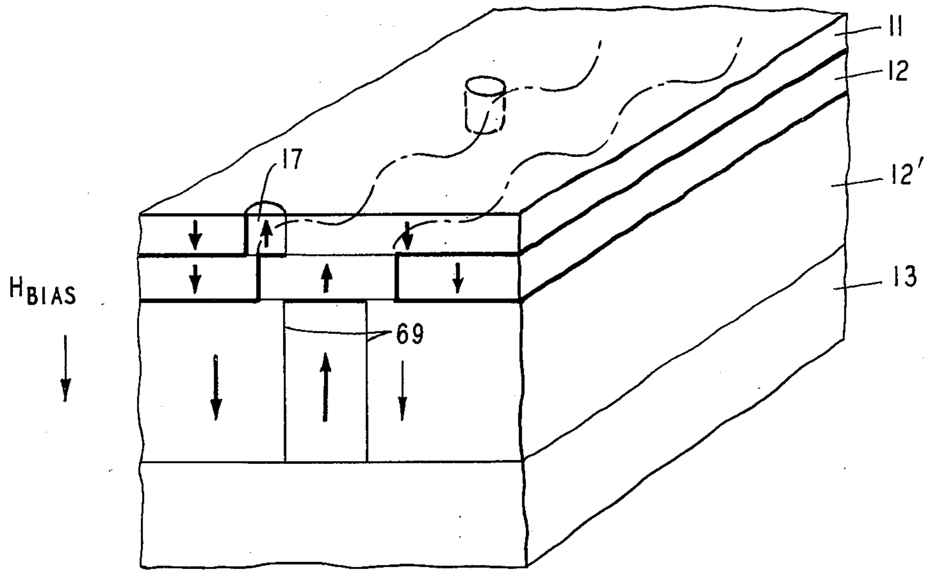
FIGS. 5–7 are schematic plan, top and cross section views of portions of alternative arrangements in accordance with this invention.

The above illustrative embodiment employs two magnetic layers with properties different from one another. Moreover, magnetic bubble patterns in one layer are employed to represent information for movement along a channel defined in another layer. But other choices exist. For example, more than one strip or ring domain can be generated in a layer. Actually, a large number of such domains can be made to define parallel channels between, for example, ones of a set of bubble generators closely packed along one edge of layer 12 and associated ones of a set of detectors at the opposite edges. Such an arrangement is realized by saturating layer 12 magnetically in a downward direction, then generating a bubble at each generator, and changing the bias conditions to allow all the bubbles to strip out. The constraint of the lateral edges of the layer and the mutual repulsion of the strip domains is operative to permit only parallel strip domains to form. Also three layer embodiments exist. Such an arrangement is shown in cross section in FIG. 5. The additional layer is designated 12' with the remaining layers being designated to correspond to their counterparts in FIG. 2A to simplify comparison with the earlier discussed embodiments. Layer 12' is occupied by a strip domain with straight walls 69. Layer 12 in this case is exchange coupled to layer 12' and exhibits walls which form fingers or cilia along the path defined by the strip in layer 12'. The reason for the formation of undulating walls of this type is disclosed in the Journal of Applied Physics, Vol. 41, No. 3, pages 1161–1162, Mar. 1, 1970, in an article entitled, "Instability of an Isolated Straight Magnetic Domain Wall" by F. B. Hagedorn.

The layers of this type of embodiment bear to one another a relationship different from that of the two-layer embodiment of FIGS. 1 and 2. The requirements are shown in the following table:

| Layer | 11 | 12 | 12' |
|---|---|---|---|
| $\sigma_w$ (wall energy) | 0.2 | 0.2 | 0.2 |
| $4\pi M_s$ | 250 gauss | 400 | 200 |
| bubble size | 3 μm | — | — |
| Thickness | 3 μm | 3 μm | 10 |

One materials system suitable for the three-layer embodiment comprises $Sm_xY_{3-x}Ga_yFe_{5-y}O_{12}$ (garnet) for each of layers 11, 12, and 12' where the ratios of the constituents of the material are chosen in accordance with well understood principles to achieve the characteristics stated in the table.

Figure 6:
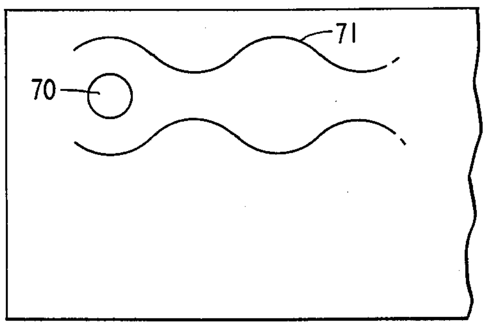
Figure 7:
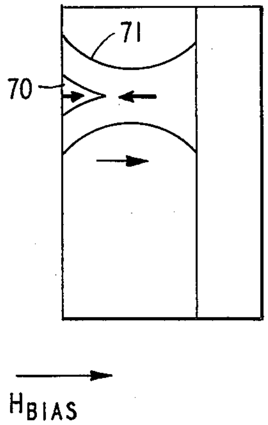

Single layer embodiments are possible also. Top and cross-sectional views of such a single layer embodiment are shown in FIGS. 6 and 7. Materials such as hexagonal ferrites exhibit reverse domains as well as an undulating strip domain in a suitable magnetic layer as is known. In a typical arrangement of this type, the magnetization of the layer is high and the layer is of a thickness so that it exhibits a $Q \approx 1$. A reverse domain 70 is shown in the figure. The domain has a conical cross section and is coupled to the corresponding undulations of the two walls of strip domain 71 in a low-energy position for movement in a manner analogous to that discussed hereinbefore. In embodiments of this type the undulations in both walls of the strip domain move in the same direction.

Other than single wall domains can be moved by the advancing undulations in the wall of a strip domain also. For example, the movement of Bloch walls, which are known to constitute parts of the walls of strip domains, along a magnetically soft bar- and T-shaped pattern has been disclosed by L. J. Schwee at the Annual Conference on Magnetism and Magnetic Materials, Denver, Colorado, Nov. 30, 1972. These walls similarly can be moved by (and actually constitute part of) the advancing undulations in accordance with this invention.

In a related embodiment, a bubble domain (including Block walls) in an adjacent layer can be made to move along a strip domain which includes such block walls in its encompassing domain wall. A rotating in-plane field rotates the magnetization of the bubble which as a consequence advances along the periodic block walls much as a nut advances along a bolt.

It has been stated hereinbefore that the undulations are observed to move in a direction determined by the direction of rotation of the in-plane field. It is helpful to consider, for a moment, one explanation for unidirectional movement of the undulations. Consider, for example, a single domain wall, say that coupled by domain 17 in FIG. 2B. When layer 11 is in a demagnetized condition, no reason occurs for a net displacement of the undulations along the wall in response to the rotating in-plane field because the undulations are equally constrained by the magnetization to either side thereof. Specifically, any modification of the undulations occurring during one half cycle of the in-plane field is equal and opposite to that which occurs during the next half cycle. But the presence of a bias field causes an imbalance in the system favoring (viz: augmenting) the changes in the undulations during a first half of the cycle and suppressing the changes during the second half, as illustrated in FIG. 4, and resulting in a net displacement per cycle. If the bias field is reversed, on the other hand, the second half cycle is favored and the direction of movement of undulations is reversed.

The imbalance can be thought of as arising from the change in distance between a selected undulating wall and like walls to either side of it. Under demagnetized conditions, all the walls are spaced apart equal distances and have equal magnetic affects on one another. The bias field decreases the distance between every other pair of walls at the expense of interleaved pairs. The result in effect is to move a "magnetically significant boundary" into coupling relationship with the selected undulating wall. In this context, a domain wall structure (viz: the undulating wall) is present and that structure responds to a cyclical magnetic field by varying reversibly. But a magnetically significant boundary is also present to constrain the domain wall structure so that the movement of that structure is irreversible.

The term magnetically significant boundary herein does not refer necessarily to a specific geometry but also encompasses, for example, a locus of positions at each of which either changes of magnetic properties or the properties themselves become significant with respect to the response of the undulating wall structure to the cyclical field. In self-structuring arrangements, in accordance with this invention, such boundaries are difficult to visualize in terms of a concrete form. This is particularly apparent in the case, for example, where directionality of movement of the wall structure is determined by arystalline anisotropy as discussed hereinafter.

Of course, means other than an externally supplied bias field for causing an imbalance in the system to effect net displacement of the undulations are available. In the described three-layer arrangement, for example, the strip domain in a first layer is operative to provide a bias field therealong functioning as the above-mentioned boundary. The wall causes the imbalance in the system in an adjacent second layer in which undulating walls occur. Specifically, in this three-layer arrangement, relatively wide strip domains in the first layer define paths with which narrow strips in the second layer try to align to reduce various forces therebetween. The undulations in the wall of the second layer occur because of the tendency to decrease magnetostatic energy in the second layer by forming equal-sized regions of opposite magnetization to the sides of the straight wall. A wall of the strip domain in the first layer thus defines a naturally occurring magnetic boundary which is followed by the undulations and that boundary operates as a constraint imparting an imbalance to the otherwise symmetrical cyclical movement of the undulations during a portion of the in-plane field cycle.

Crystalline anistropy also is operative to cause an imbalance in a system of this type in a manner to allow movement of the undulations. Where, the imbalance is due solely to crystalline anisotropy, movement occurs only along selected crystal axes. Consequently, where straight line channels are desired, inputs and outputs are spaced apart from one another along such axes. The movement of undulations about a turn in a channel transverse to such an axis can be achieved in the presence of a bias field which along with crystalline anisotropy causes the requisite imbalance. The magnetically significant boundary in arrangements employing crystalline anisotropy include a "boundary" which is a locus of points at each of which the magnetic properties depend on angular orientation in the plane of the layer.

When adjacent undulating domain walls are spaced apart a sufficient distance to be independent of one another, they exhibit undulations which can be made to move in directions opposite to one another in response to a given rotating in-plane field. Accordingly, a bubble domain which strips out, but which maintains defined ends (viz: a meandering C-shaped domain) rather than closing on itself as shown in FIG. 1, is operative as a recirculating channel for domains (see 17 of FIG. 1).

A variety of embodiments have been described herein employing one or more layers and operative to move information in any one of a variety of representations. But in all of these cases, a magnetic field rotating in the plane of the layers provided the drive. Nevertheless, it is contemplated that a varying bias field is operative also to provide the requisite drive.

What has been described is considered merely illustrative of the principles of this invention. Therefore, various modifications can be devised by those skilled in the art in accordance with those principles within the spirit and scope of this invention as encompassed by the following claims.

What is claimed is:

1. Magnetic apparatus comprising a first layer of magnetic material having properties such as to be capable of having a domain wall formed therein in response to the presence of a magnetic field in a first range, said wall extending between first and second positions in a manner to form an information channel therebetween in the absence of propagation-assisting physical structures, first means coupled to said layer for introducing a magnetic indication of information to said channel at said first position, and second means also coupled to said layer for detecting said magnetic indication of information at said second position, said magnetic indication being moveable from said first to said second position in the presence of a magnetic field in said first range, said wall having properties such as to be operative in the presence of a magnetic drive field to move said indication therealong.

2. Magnetic apparatus in accordance with claim 1 also including third means for moving said magnetic indication controllably along said channel.

3. Magnetic apparatus in accordance with claim 2 wherein said first layer comprises a material characterized by a domain wall having undulations therein.

4. Magnetic apparatus in accordance with claim 3 wherein said third means comprises means for moving said undulations along said wall.

5. Magnetic apparatus in accordance with claim 4 wherein said third means comprises means for generating a magnetic drive field reorienting in the plane of said layer.

6. Magnetic apparatus in accordance with claim 5 wherein said first means comprising a second layer of magnetic material coupled to said first layer and capable of having single wall domains moved therein, and means for selectively generating in said second layer a pattern of single wall domains representative of information.

7. Magnetic apparatus in accordance with claim 6 wherein said second means comprises a detector of single wall domains coupled to said second layer.

8. Magnetic apparatus in accordance with claim 2 wherein said third means includes a second layer coupled to said first layer and having properties to form a strip domain wall corresponding to the wall of the strip domain wall in said first layer and having undulations therein.

9. Magnetic apparatus in accordance with claim 8 wherein said first means comprising a third layer of magnetic material coupled to said second layer and being capable of having single wall domains moved therein, and means for selectively generating in said third layer a pattern of single wall domains representative of information.

10. Magnetic apparatus in accordance with claim 3 wherein said first layer comprises a material characterized by conical domains therein.

11. Magnetic apparatus comprising a layer of material in which magnetic domain walls can be moved, first means for establishing a magnetically significant boundary along a path between first and second positions in said layer, second means for defining along said path a magnetic domain wall structure having a periodic geometry which changes symmetrically with respect to said boundary in response to a magnetic field reorienting cyclically, said wall being coupled to said boundary in a manner to provide an imbalance in said changes in geometry during a portion of the cycle of said field.

12. Magnetic apparatus in accordance with claim 11 wherein said magnetic field reorients cyclically in the plane of said layer.

13. Magnetic apparatus in accordance with claim 12 including means for introducing information to and means for detecting information at said first and second positions, respectively.

14. Magnetic apparatus in accordance with claim 13 wherein said first means for establishing said boundary comprises a domain wall.

15. Magnetic apparatus in accordance with claim 14 wherein said first means comprises a crystallographic axis of said layer.

16. Magnetic apparatus comprising a layer of material in which magnetic domain walls can be moved, means for defining in said layer a domain wall structure which varies reversibly in response to a cyclically varying magnetic field, means for defining a magnetically significant boundary coupled to said wall structure in a manner to define a path to render said variations irreversible thereby effecting movement of said wall structure along said path.

* * * * *